Patented Mar. 20, 1923.

1,449,111

UNITED STATES PATENT OFFICE.

FRIEDRICH HAYDUCK, OF WILMERSDORF, GERMANY, ASSIGNOR TO THE FLEISCH-MANN COMPANY, OF NEW YORK, N. Y., A CORPORATION OF OHIO.

PROCESS FOR THE MANUFACTURE OF YEAST. REISSUED

No Drawing.  Application filed October 30, 1920. Serial No. 420,838.

(GRANTED UNDER THE PROVISIONS OF THE ACT OF MARCH 3, 1921, 41 STAT. L., 1313.)

*To all whom it may concern:*

Be it known that I, FRIEDRICH HAYDUCK, citizen of Germany, residing at Wilmersdorf, Germany, have invented certain new and useful Improvements in Processes for the Manufacture of Yeast, of which the following is a specification.

This invention relates to a process for the manufacture of yeast and more particularly to a process in which the yeast to be used as seed yeast is given a preliminary fermentation.

An object of this invention is to provide an improved process of manufacture in which seed yeast is treated in a wort containing sugar material and inorganic salts in order to render it devoid of infection.

Yeast growing processes in which nutrient solutions comprising sugar material and inorganic yeast nutrient salts are employed exclusively, are known. Examples of such processes are described in my co-pending applications Serial Nos. 420,829 and 420,830, corresponding respectively to German Letters Patent Nos. 300,663 and 303,251. In these processes it is preferable to render innocuous the excess of acid liberated from the nutrient salts, by adding a neutralizing agent, for example, chalk, as taught in my co-pending application Serial No. 420,830. By this step of neutralization such processes are made to give very high yields of yeast. In the practice of neutralization, however, there is a disadvantage in that the yeast growth takes place in a nearly neutral or but weakly acid nutrient solution. As a consequence yeast grown in such worts has little protection against the growth of infecting micro-organisms and it is desirable therefore to protect the yeast against infection, or the action of such undesirable micro-organisms. To this end yeast, to be used as seed yeast, is treated with a quantity of sulphuric acid sufficient to kill all the infecting organisms.

In the practice of my present invention the step, by which such organisms are killed and the yeast rendered devoid of infection, is carried out in a manner such that sulphuric acid per se is not used, but only the action of its acid radical employed. This is accomplished by causing the yeast to undergo a preliminary fermentation in an aqueous nutrient solution containing sugar material and inorganic yeast nutrient salts but without the addition of chalk.

When yeast is multiplying in such a nutrient solution, inorganic acid radicals are continually being released from the salts employed, forming a steadily increasing amount of acid in the solution. The acid thus formed is permitted to accumulate until a degree of acidity is attained which removes from the yeast the undesired infecting organisms without the direct addition of any sulphuric acid.

The following is an example of the manner in which the process of this invention is carried out:

A nutrient solution is made up comprising sugar or molasses and inorganic yeast nutrient salts. The proportions in which these nutrients are to used may be taken, for example, as set forth in my co-pending application Serial No. 420,829, which are as follows: sugar 100 parts dissolved in tap water, ammonium sulphate 6 parts, ammonium dihydrogen phosphate 2 parts, potassium sulphate 4 parts, gypsum $2\frac{1}{4}$ parts, and magnesium sulphate $2\frac{1}{4}$ parts, the whole being made up with water to a total of 6500 to 7000 parts. As further examples, the proportions of nutrients to be dissolved in water may be taken as set forth in my co-pending application Serial No. 420,833, which are as follows: sugar 100 parts, ammonium sulphate 40 parts, acid potassium phosphate 9 parts, magnesium sulphate 1 part; or molasses (containing 50% sugar) 100 parts, ammonium sulphate 10 parts, superphosphate (having 18% water soluble phosphoric acid) 10 parts, magnesium sulphate 0.5 parts.

Having prepared one of these, or a similar nutrient solution, the next step is to take a part of the solution and place it in a vat. Yeast, to be used as seed yeast, is now caused to undergo a preliminary fermentation in the vat containing such part of the nutrient solution, while slightly aerating or stirring the solution. Yeast multiplication is accompanied by an increasing acidity until the required degree of acidity is attained (this degree of acidity is approximately $\frac{N}{40}$, corresponding to a sulphuric acid content of approximately 0.125%); after which the contents of the preliminary fermentation vat are transferred to the main vat where the remainder of the nutrient solution is added. Here yeast propagation is carried on with aeration, the required amount of chalk as a neutralizing agent being added.

A process is known of treating yeast in distilleries with a nutrient in which lactic acid is gradually neutralized by adding ammonia, which provides yeast assimilable nitrogen. (See, for instance, United States Letters Patent to Pollak No. 1,123,920.) In this process yeast, as it consumes the resulting ammonium salt, again sets free the lactic acid, thus requiring the progressive neutralization of the acid liberated.

The practice of the present invention, however, clearly differs from this prior process in that the newly released sulphuric acid is purposely left unneutralized up to a predetermined degree.

Furthermore, the step of freeing yeast from infection in a so-called "purification fermentation" by the addition of sulphuric acid is old; also that of regenerating waste yeast by a preliminary fermentation in an acidified sugar solution containing inorganic salts, is known. In the present process, however, no sulphuric acid per se is added, recourse being had for sterilization only to the action of the inorganic acid liberated from the nutrient salts by the growing yeast.

The well known fact that the life and fermentation activity of the yeast is favorably influenced by preliminary neutralization of the substances having an acid reaction contained in the original fermentation liquid, has not led previous to my invention herein referred to to a process dealing with a systematic neutralization of the acids, as the industry is accustomed to the growth of yeast in acid solutions and therefore could not expect an important increase in the yield of yeast by the neutralization of the acids.

Having described my invention, what I claim as new and desire to secure by Letters Patent, is:—

1. The process of manufacturing yeast which comprises causing yeast to undergo a preliminary fermentation in an aqueous nutrient solution comprising sugar material and inorganic yeast nutrient salts, permitting the accumulation of liberated acid during such preliminary fermentation to an extent sufficient to afford substantial protection for the yeast against infecting micro-organisms, and thereafter using the treated yeast as seed yeast for propagating purposes in a nutrient solution comprising sugar material and inorganic yeast nutrient salts; the propagation being effected with neutralization of at least a substantial portion of the liberated acid.

2. The process of manufacturing yeast which comprises causing yeast to undergo a preliminary fermentation in an aqueous nutrient solution containing inorganic yeast nutrient salts, permitting the accumulation of liberated acid during such preliminary fermentation to an extent sufficient to afford substantial protection for the yeast against infecting micro-organisms, and thereafter using the treated yeast as seed yeast for propagating purposes in a suitable nutrient solution; the propagation being effected with neutralization of the deleterious excess of acid which is liberated.

3. The process of manufacturing yeast which comprises causing yeast to undergo a preliminary fermentation in an aqueous nutrient solution containing sulphates, permitting the accumulation of liberated acid during such preliminary fermentation to an extent sufficient to afford substantial protection for the yeast against infecting micro-organisms, and thereafter using the treated yeast as seed yeast for propagating purposes in a nutrient solution comprising sugar material, inorganic yeast nutrient salts and an acid neutralizing agent.

4. In the process of manufacturing compressed bakers' yeast, the steps of preparing seed yeast adapted for propagating purposes in nutrient solutions comprising sugar material and inorganic salts, which comprise causing yeast to undergo a preliminary fermentation in a nutrient solution comprising sugar material and inorganic yeast nutrient salts, and permitting the accumulation of liberated acid during such preliminary fermentation to an extent sufficient to afford substantial protection for the yeast against infecting micro-organisms.

In testimony whereof, I have affixed my signature.

FRIEDRICH HAYDUCK.